United States Patent
Ishigo et al.

(10) Patent No.: US 8,905,639 B2
(45) Date of Patent: Dec. 9, 2014

(54) MAIN BEARING FOR CRANKSHAFT OF INTERNAL COMBUSTION ENGINE

(71) Applicant: Daido Metal Company Ltd., Nagoya (JP)

(72) Inventors: Osamu Ishigo, Inuyama (JP); Yuichi Tomita, Inuyama (JP); Motohira Yamada, Inuyama (JP)

(73) Assignee: Daido Metal Company Ltd., Nagoya (JP)

(*) Notice: Subject to any disclaimer, the term of this patent is extended or adjusted under 35 U.S.C. 154(b) by 34 days.

(21) Appl. No.: 13/739,298

(22) Filed: Jan. 11, 2013

(65) Prior Publication Data

US 2013/0182981 A1   Jul. 18, 2013

(30) Foreign Application Priority Data

Jan. 17, 2012  (JP) ................... 2012-006719

(51) Int. Cl.
  *F16C 33/10* (2006.01)
  *F16C 33/04* (2006.01)
  *F16C 17/02* (2006.01)
  *F16C 9/02* (2006.01)

(52) U.S. Cl.
  CPC ............ *F16C 9/02* (2013.01); *F16C 33/046* (2013.01); *F16C 2360/22* (2013.01); *F16C 33/1065* (2013.01); *F16C 17/022* (2013.01)
  USPC .......................................... 384/288; 384/291

(58) Field of Classification Search
  CPC .... F16C 9/02; F16C 33/1065; F16C 2360/22; F16C 33/046
  USPC .............. 384/283, 286, 288, 291, 294, 429
  See application file for complete search history.

(56) References Cited

U.S. PATENT DOCUMENTS

| | | | | |
|---|---|---|---|---|
| 5,009,522 | A * | 4/1991 | Hahn | 384/288 |
| 6,695,482 | B2 * | 2/2004 | Niwa et al. | 384/294 |
| 7,234,870 | B2 * | 6/2007 | Kitahara et al. | 384/288 |
| 7,281,854 | B2 * | 10/2007 | Terada et al. | 384/288 |

(Continued)

FOREIGN PATENT DOCUMENTS

| | | |
|---|---|---|
| DE | 102005011372 | 10/2005 |
| EP | 1911986 | 4/2008 |

(Continued)

OTHER PUBLICATIONS

European Search Report dated Jul. 12, 2013 from corresponding European Patent Application Serial No. 13150780.8-1758 (four pages).

(Continued)

*Primary Examiner* — Thomas R. Hannon
*Assistant Examiner* — Adam D Rogers
(74) *Attorney, Agent, or Firm* — Harness, Dickey & Pierce, P.L.C.

(57) ABSTRACT

A main bearing for a crankshaft of an internal combustion engine is composed of a pair of semi-cylindrical bearings. An oil groove extending in a circumferential direction is formed on an inner circumferential surface of one semi-cylindrical bearing. The oil groove has the depth gradually decreasing toward a circumferential end surface of the one semi-cylindrical bearing, and defines a circumferential end portion on the circumferential surface without extending to an axial groove formed in a joint portion of the pair of semi-cylindrical bearings. An extension portion of the inner circumferential surface extends between the circumferential end portion and the axial groove, and a plurality of circumferential grooves extending in the circumferential direction is formed on the extension portion from the oil groove to the axial groove over an entire width of the circumferential end portion of the oil groove.

14 Claims, 12 Drawing Sheets

(56) References Cited

U.S. PATENT DOCUMENTS

| | | |
|---|---|---|
| 8,556,513 B2 * | 10/2013 | Ishigo et al. ............... 384/288 |
| 2005/0201647 A1 | 9/2005 | Kuroda et al. |
| 2005/0213859 A1 | 9/2005 | Kuroda et al. |
| 2013/0156358 A1 * | 6/2013 | Ishigo et al. ............... 384/397 |
| 2013/0251294 A1 * | 9/2013 | Ishigo et al. ............... 384/397 |

FOREIGN PATENT DOCUMENTS

| | | |
|---|---|---|
| JP | 56-071526 | 6/1981 |
| JP | 61-000573 | 1/1986 |
| JP | 2-88017 | 7/1990 |
| JP | 04-219521 | 8/1992 |
| JP | 2005-249024 | 9/2005 |
| JP | 2005-256917 | 9/2005 |
| JP | 2008-095858 | 4/2008 |
| JP | 2011-179572 | 9/2011 |

OTHER PUBLICATIONS

Office Action dated Nov. 29, 2013 from corresponding Japanese Patent Serial No. 2012-006719 (five pages).

* cited by examiner

MAIN BEARING FOR CRANKSHAFT OF INTERNAL COMBUSTION ENGINE

BACKGROUND OF THE INVENTION (1) Field of the Invention

The present invention relates to a main bearing for a crankshaft of an internal combustion engine, and more particularly relates to a main bearing for supporting a journal portion of a crankshaft in a cylinder block lower portion of an internal combustion engine. Further, the present invention also relates to a bearing device which is configured by such a main bearing and a shaft section corresponding thereto.

(2) Description of Related Art

A crankshaft of an internal combustion engine is supported at a journal portion thereof in a cylinder block lower portion of the internal combustion engine via a main bearing formed by a pair of semi-cylindrical bearings. In order to lubricate the main bearing, lubricating oil pumped by an oil pump is fed through an oil gallery which is formed in a wall of the cylinder block and a through port which is formed in a wall of the main bearing into a lubricating oil groove which is formed along an inner circumferential surface of the main bearing. In the crankshaft, a first lubricating oil path is formed to penetrate the journal portion in a diameter direction, and communicates with the lubricating oil groove of the main bearing though both end openings thereof. Furthermore, a second lubricating oil path is formed to branch from the first lubricating oil path and pass through a crank arm section, and communicates with a third lubricating oil path which is formed to penetrate a crankpin in a diameter direction thereof. Accordingly, the lubricating oil having been fed into the lubricating oil groove of the main bearing passes through the first lubricating oil path, the second lubricating oil path and the third lubricating oil path, and thereafter, is supplied to a slide surface between the crankpin and a connecting rod bearing from an end portion opening (lubricating oil outlet which is formed on an outer circumferential surface of the crankpin) of the third lubricating oil path.

The lubricating oil groove of the main bearing is formed on an inner circumferential surface of at least one of a pair of semi-cylindrical bearings throughout an entire length in a circumferential direction thereof (see FIG. 1 of JP-Y2-61-00573). In this case, the lubricating oil which is supplied to the lubricating oil groove of the main bearing from the oil gallery in the cylinder block mainly flows to the end portion in the circumferential direction of the semi-cylindrical bearing in accordance with rotation of the journal portion, and most of the lubricating oil is discharged to an outside of the bearing through the axial groove formed in the joint portion of the pair of semi-cylindrical bearings.

Furthermore, in recent years, in order to reduce the leakage amount of lubricating oil from an end portion in a circumferential direction of a semi-cylindrical bearing, in response to miniaturization of a lubricating oil supplying oil pump for the purpose of enhancing fuel efficiency of an internal combustion engine, there is used a main bearing in which the length in the circumferential direction of a lubricating oil groove is configured to be shorter than the entire length in the circumferential direction of the semi-cylindrical bearing, and therefore, at least one of both end portions in the circumferential direction of the lubricating oil groove does not extend to the end portion in the circumferential direction of the semi-cylindrical bearing (namely, does not open at an axial groove) (see JP-Y2-61-00573, JP-A-04-219521, JP-A-2005-249024, JP-A-2011-179572 and JP-A-2008-095858).

BRIEF SUMMARY OF THE INVENTION

The lubricating oil which is fed to the connecting rod bearing from the oil gallery in the cylinder block through the main bearing and the internal lubricating oil paths of the crankshaft is likely to be accompanied by residual foreign matters generated at the time of machining of respective components, for example. The foreign matter is likely to damage a slide surface between the journal portion and the main bearing and a slide surface between the crankpin and the connecting rod bearing, and therefore, needs to be quickly discharged to the outside from the flow of the lubricating oil.

In the conventional main bearing in which the lubricating oil groove is formed in the inner circumferential surface throughout the entire length in the circumferential direction of the semi-cylindrical bearing, the lubricating oil which is supplied to the lubricating oil groove of the main bearing from the oil gallery in the cylinder block can flow to the end portion in the circumferential direction of the semi-cylindrical bearing, and therefore, the foreign matter accompanying the lubricating oil can be discharged to the outside of the bearing through a gap formed by the axial groove of the main bearing and the journal portion. However, in the case of the main bearing which is configured so that at least one of both end portions in the circumferential direction of the lubricating oil groove does not reach the axial groove, in order to reduce the leakage amount of the lubricating oil from the axial groove in response to miniaturization of the lubricating oil supplying oil pump as described above, not only the lubricating oil but also the foreign matter is difficult to be discharged from the lubricating oil groove of the main bearing, and tends to remain in the vicinity of the end portions in the circumferential direction of the lubricating oil groove.

The foreign matter which remains in the vicinity of the end portions in the circumferential direction of the lubricating oil groove becomes the cause of inducing damage to the slide surface between the journal portion and the main bearing. Further, the foreign matter enters the lubricating oil path in the inside of the crankshaft when the inlet opening of the first lubricating oil path formed on the outer circumferential surface of the journal portion passes the vicinity of the end portion of the lubricating oil groove, and is fed to the slide surface between the crankpin and the connecting rod bearing, where the foreign matter also becomes the cause of inducing damage. As a result, the main bearing which is configured so that at least one of both end portions in the circumferential direction of the lubricating oil groove does not reach the axial groove reduces the life of not only the main bearing itself but also the connecting rod bearing.

Accordingly, an object of the present invention is to provide a main bearing having an excellent foreign matter discharging function while reducing the leakage amount of oil, that is, a main bearing which can prevent a large number of foreign matters from remaining at an end portion in a circumferential direction of a lubricating oil groove while suppressing outflow of lubricating oil to an axial groove from the end portion in the circumferential direction of the lubricating oil groove formed in a bearing inner circumferential surface. Another object of the present invention is to provide a bearing device which is configured by such a main bearing and a journal portion.

In order to attain the above-described objects, according to a first aspect of the present invention, there is provided a main bearing for a crankshaft of an internal combustion engine as follows.

A main bearing for a crankshaft of an internal combustion engine for rotatably supporting a journal portion of the crankshaft, wherein the main bearing is composed of a pair of semi-cylindrical bearings, and defines an axial direction and a circumferential direction, only one of the semi-cylindrical bearings comprises an oil groove formed on an inner circumferential surface thereof, the oil groove extends in the circumferential direction at least through a center portion of the one semi-cylindrical bearing in the circumferential direction, the depth of the oil groove from the inner circumferential surface gradually decreases toward a circumferential end surface of the one semi-cylindrical bearing so as to define a circumferential end portion of the oil groove on the inner circumferential surface, so that the oil groove does not extend to the circumferential end surface, the circumferential end surface of the one semi-cylindrical bearing to which the oil groove does not extend, and a circumferential end surface of the other semi-cylindrical bearing which is joined to the one semi-cylindrical bearing respectively include inclined surfaces extending on an inner circumferential surface side over an entire length thereof in the axial direction, so that an axial groove is formed at a joint portion of the pair of semi-cylindrical bearings, and an extension portion of the inner circumferential surface extends between the axial groove and the oil groove, a plurality of circumferential grooves extending in the circumferential direction from the axial groove to the oil groove are formed on the extension portion of the inner circumferential surface over an entire width of the circumferential end portion of the oil groove in the axial direction, the depth of the circumferential groove from the extension portion of the inner circumferential surface is smaller than the depth of the oil groove, so that an overlap region where the circumferential groove and the oil groove overlap each other is formed in a region where the depth of the oil groove decreases, and the depth of each of the circumferential grooves is within a range of 0.002 to 0.015 mm and constant in the circumferential direction, the width of each of the circumferential grooves in the axial direction is within a range of 0.1 to 1 mm and constant in the circumferential direction, and the length of the overlap region in the circumferential direction is within a range of 0.03 to 0.15 mm.

In one embodiment of the present invention, the depth of the axial groove from the inner circumferential surface is 0.1 to 0.5 mm, and the width of the axial groove in the circumferential direction is 0.2 to 2 mm.

In another embodiment of the present invention, the circumferential grooves are formed on the inner circumferential surface over an entire width of the one semi-cylindrical bearing in the axial direction. Further, the circumferential grooves may be formed on the inner circumferential surface so as to extend in the circumferential direction around a rotational axis of the main bearing within a range of 50° from the circumferential end surface at which the axial groove is formed.

In still another embodiment of the present invention, the one semi-cylindrical bearing has the circumferential grooves at both sides in the circumferential direction.

In still another embodiment of the present invention, the semi-cylindrical bearing has a crush relief on an inner circumferential surface side adjacent to the circumferential end surface at which the axial groove is formed. An end portion of the crush relief on a center side in the circumferential direction of the one semi-cylindrical bearing is located on a circumferential end surface side relative to an end portion of the circumferential groove on the center side in the circumferential direction.

In still another embodiment of the present invention, the journal portion includes a lubricating oil path extending in an inside thereof, and an inlet opening of the lubricating oil path that is formed on an outer circumferential surface thereof, and the oil groove is disposed so that a center of the width of the oil groove in the axial direction is aligned with a center of the inlet opening of the journal portion.

Preferably, a length L1 of the extension portion of the inner circumferential surface in the circumferential direction, and a length Lo of the inlet opening of the journal portion in the circumferential direction satisfy the following relational expression:

$$Lo \times 1.5 > L1.$$

Preferably, a length L1 of the extension portion of the inner circumferential surface in the circumferential direction, and a length Lo of the inlet opening of the journal portion in the circumferential direction satisfy the following relational expression:

$$Lo - L1 \geq 0.5 \text{ mm}.$$

Preferably, a length L1 of the extension portion of the inner circumferential surface in the circumferential direction, and a length Lo of the inlet opening of the journal portion in the circumferential direction satisfy the following relational expression:

$$L1 \geq Lo \times 0.3,$$

and more preferably satisfy $$L1 \geq Lo \times 0.6.$$

In yet another embodiment of the present invention, the area of the inlet opening on an outer circumferential surface of the journal portion is larger than the sectional area of the lubricating oil path in the journal portion, so that a channel transition portion of which the sectional area gradually changes is formed between the inlet opening and the lubricating oil path.

More preferably, a depth dimension of the channel transition portion from the outer circumferential surface of the journal portion is 1 to 2 mm.

According to a second aspect of the present invention, a bearing device comprising the main bearing for a crankshaft according to the first aspect described above, and the journal portion supported by the main bearing is provided.

By adopting the configuration of the present invention, the lubricating oil which is supplied into the lubricating oil groove through the through port formed in the wall of the main bearing is restrained from flowing out from the axial groove of the main bearing by a plurality of circumferential grooves formed on the extension portion of the inner circumferential surface that extends between the circumferential end portions of the oil groove and the axial groove, while the foreign matter accompanying the lubricating oil is guided from the oil groove to the axial groove by the steady flow of the oil flowing in the plurality of circumferential grooves so as to be properly discharged from the axial groove of the main bearing.

Other objects, features and advantages of the present invention will become apparent from the following description of the embodiments of the present invention concerning the accompanying drawing.

DETAILED DESCRIPTION OF THE INVENTION

Embodiment 1

Hereinafter, an embodiment of the present invention will be described with reference to the accompanying drawing.

Figure 1:
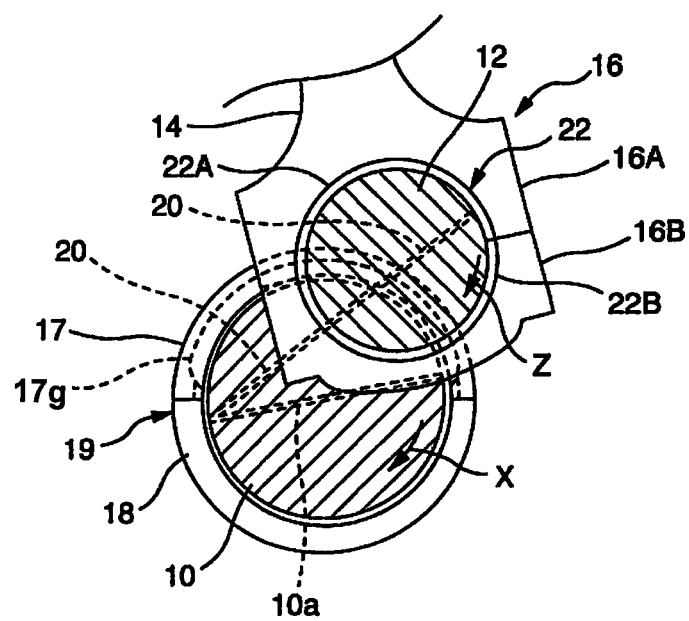
FIG. 1 is a schematic view of a crankshaft of an internal combustion engine cut at a journal portion and a crankpin section respectively.

FIG. 1 is a schematic view of a crankshaft of an internal combustion engine cut at a journal portion and a crankpin section respectively, and shows a journal portion 10, a crankpin 12 and a connecting rod 14. As a positional relationship of the three members in a paper surface depth direction, the journal portion 10 is at a back side of the paper surface, the crankpin 12 is at a front side, and the crankpin 12 is enveloped by a large end portion housing 16 of the connecting rod 14 which carries a piston at the other end.

The journal portion 10 is supported in a cylinder block lower portion (not illustrated) of the internal combustion engine via a main bearing 19 which is configured by a pair of semi-cylindrical bearings 17 and 18. An oil groove 17q which extends in a circumferential direction except for regions near both ends of the main bearing is formed on an inner circumferential surface only in the semi-cylindrical bearing 17 which is located on an upper side in the drawing. The journal portion 10 has a through-hole (lubricating oil path) 10a in a diameter direction thereof, and when the journal portion 10 rotates in an arrow X direction, inlet openings at both ends of the through-hole 10a alternately communicate with the oil groove 17q. Note that if the oil grooves are formed in the semi-cylindrical bearings 17 and 18 on both upper and lower sides, the leakage amount of the lubricating oil from the main bearing 19 increases, and therefore, in the present invention, the oil groove is formed only in either one of the semi-cylindrical bearings on both upper and lower sides.

A lubricating oil path 20 which penetrates through the journal portion 10, a crank arm not illustrated and the crankpin 12 to communicate with the through-hole 10a is formed in the inside of the crankshaft.

The crankpin 12 is held by the large end portion housing 16 (configured by a connecting rod side large end portion housing 16A and a cap side large end portion housing 16B) of the connecting rod 14, via a connecting rod bearing 22 which is configured by a pair of semi-cylindrical bearings 22A and 22B.

FIGS. 2 to 9 show the details of the pair of semi-cylindrical bearings 17 and 18 which configure the main bearing 19. The semi-cylindrical bearing 17 on the upper side of the paper surface has a front side circumferential end surface 17A which is disposed on a front side in the rotational direction X of the journal portion 10, and a rear side circumferential end surface 17B which is disposed on a rear side. The semi-cylindrical bearing 18 on the lower side has a front side circumferential end surface 18B which is disposed on the front side in the rotational direction X of the journal portion 10, and a rear side circumferential end surface 18A which is disposed on the rear side. The front side circumferential end surface 17A of the semi-cylindrical bearing 17 abuts on the rear side circumferential end surface 18A of the semi-cylindrical bearing 18, and the front side circumferential end surface 18B of the semi-cylindrical bearing 18 abuts on the rear side circumferential end surface 17B of the semi-cylindrical bearing 17, whereby the main bearing 19 in a cylindrical shape is configured.

The front side circumferential end surface 17A and the rear side circumferential end surface 17B of the semi-cylindrical bearing 17 respectively have inclined surfaces 17C and 17D which are each formed in a chamfered manner throughout an entire length in the axial direction on inner circumferential surface sides, and the front side circumferential end surface 18B and the rear side circumferential end surface 18A of the semi-cylindrical bearing 18 respectively have inclined surfaces 18D and 18C which are similarly formed throughout an entire length in the axial direction on inner circumferential sides, whereby axial grooves 24A and 24B are formed at joint portions of the semi-cylindrical bearings 17 and 18.

Figure 2:
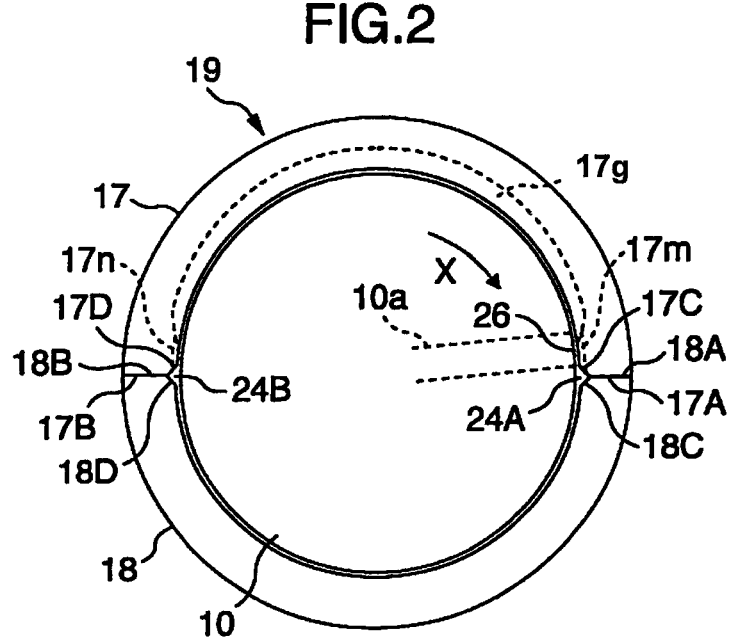
FIG. 2 is a front view of a crankshaft main bearing and the crankshaft according to embodiment 1 of the present invention.
Figure 3:
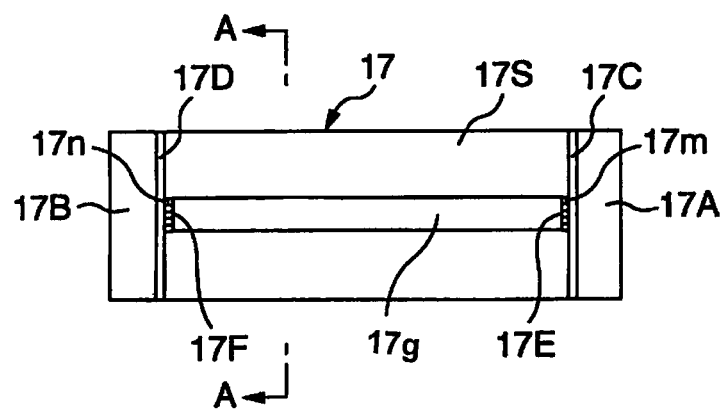
FIG. 3 is a plan view of a semi-cylindrical bearing on an upper side of the main bearing shown in FIG. 2, seen from a bearing inner circumferential surface side.
Figure 4:
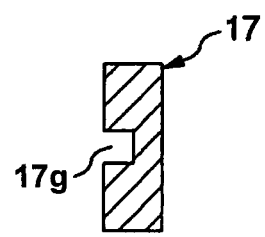
FIG. 4 is a sectional view of the semi-cylindrical bearing shown in FIG. 3, seen from the line A-A.
Figure 5:
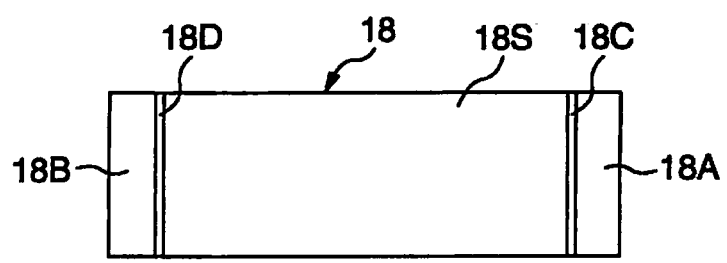
FIG. 5 is a plan view of a semi-cylindrical bearing on a lower side of the main bearing shown in FIG. 2, seen from a bearing inner circumferential surface side.

As is understood from FIGS. 2 to 4, the oil groove 17q which is formed on an inner circumferential surface 17S of the semi-cylindrical bearing 17 has a rectangular section in a direction perpendicular to the axial direction of the main bearing 19, a depth thereof is constant in a region including a central portion in the circumferential direction, and the depth gradually decreases toward the end portions in both regions near the end portions in the circumferential direction. Both circumferential end portions 17E and 17F of the oil groove 17q do not extend to the inclined surface 17C and the inclined surface 17D respectively, and therefore, an extension portion 17S' of the inner circumferential surface 17S extends with a length L1 in the circumferential direction between the end portion 17E and the inclined surface 17C, and between the end portion 17F and the inclined surface 17D, as shown in FIG. 6.

Figure 6:
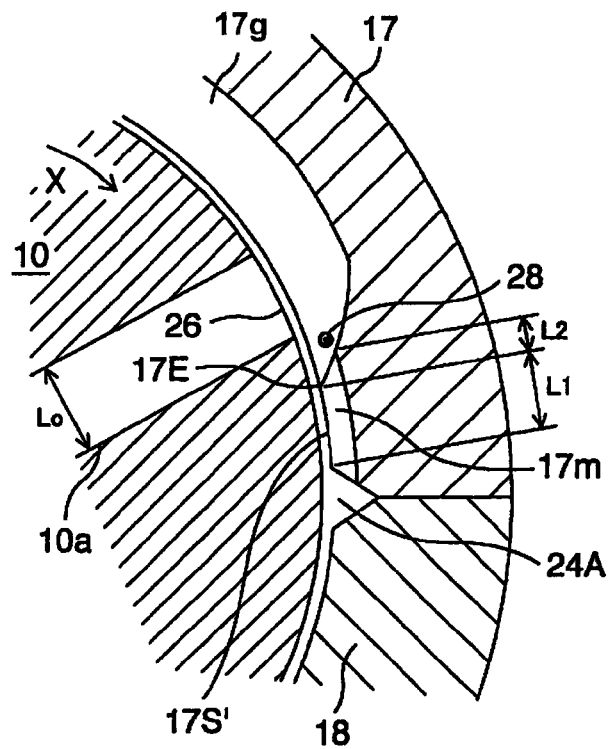
FIG. 6 is an enlarged sectional view of a joint portion of the main bearing and the crankshaft shown in FIG. 2, seen from an axial direction.
Figure 7:
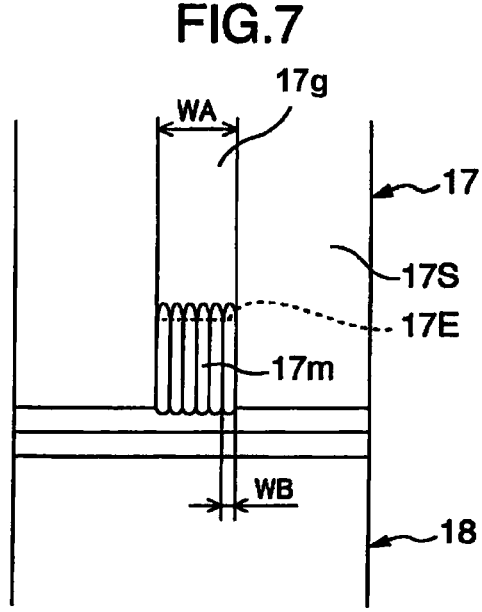
FIG. 7 is a view of the joint portion of the main bearing shown in FIG. 2, seen from the bearing inner circumferential surface side.

As is understood from FIGS. 3, 6 and 7, in the extension portions 17S', a plurality of circumferential grooves 17m and 17n respectively extend over an entire width WA of the oil groove 17q so as to allow the oil groove 17q to communicate with the axial grooves 24A and 24B. As is understood from FIGS. 7 and 9, a width WB of the circumferential groove 17m is accordingly smaller than the width WA of the oil groove 17q, and is constant from the end portion 17E of the oil groove 17g to the axial groove 24A. In the present embodiment, the circumferential grooves 17m and 17n are formed so that WA=6.times.WB is satisfied. Further, a maximum depth D2 of the circumferential groove 17m from the extension portion 17S' is also constant, and is smaller than the depth of the oil groove 17q from the inner circumferential surface 17S, and a maximum depth D1 (FIG. 8) of the axial groove 24A.

Note that the oil groove 17q has the depth gradually decreasing toward the end portion in the region near the circumferential end portion, and therefore, the oil groove 17q and the circumferential groove 17m overlap each other in an overlap region having a length L2 along the circumferential direction as shown in FIG. 6. In the present embodiment, the circumferential groove 17m has the width gradually decreasing in the overlap region L2 beyond the end portion 17E of the oil groove 17q, and the circumferential end portion of the circumferential groove 17m is located on a bottom surface of the oil groove 17g (FIGS. 6 and 7).

Figure 9:
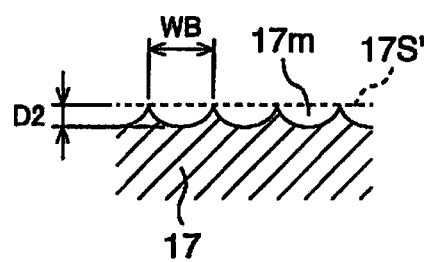
FIG. 9 is an enlarged sectional view of a circumferential groove of the semi-cylindrical bearing shown in FIG. 7.

As is understood from FIG. 9, in the present embodiment, the sections of the circumferential grooves 17m and 17n perpendicular to the axial direction of the main bearing 19 are arc-shaped. However, as long as an upper end of each of the circumferential grooves practically reaches the extension portion 17S' of the inner circumferential surface 17S and thereby each of the circumferential grooves has the depth D2, the sections of the circumferential grooves may be in another shape such as a rectangular shape and a V-shape.

As is understood from FIG. 3, the oil groove 17g is disposed at a center of a width in the axial direction of the semi-cylindrical bearing 17. A through port (not illustrated) which is penetrated through the semi-cylindrical bearing 17 in a radial direction is formed in a bottom portion of the oil groove 17g, and the lubricating oil is supplied into the oil groove 17g through the through port from the oil gallery in the wall of the cylinder block. Thereafter, a part of the lubricating oil flows forward in the rotational direction in the oil groove 17g in accordance with rotation in the arrow X direction of the journal portion 10, and the other part of the lubricating oil flows in an opposite direction to the rotational direction in the oil groove 17g. Further, the semi-cylindrical bearing 17 is disposed so that a center in the width direction of the oil groove 17g is aligned with the center of an inlet opening 26 of the lubricating oil path 10a of the journal portion 10, and therefore, the lubricating oil supplied into the oil groove 17g can further flow to the connecting rod bearing 22 through the inlet opening 26. The size of the inlet opening 26 of the lubricating oil path 10a in the journal portion 10 may differ depending on the specifications of the internal combustion engine, and, for example, in the case of a compact internal combustion engine for a passenger car, the size is approximately 5 to 8 mm in diameter.

Figure 10:
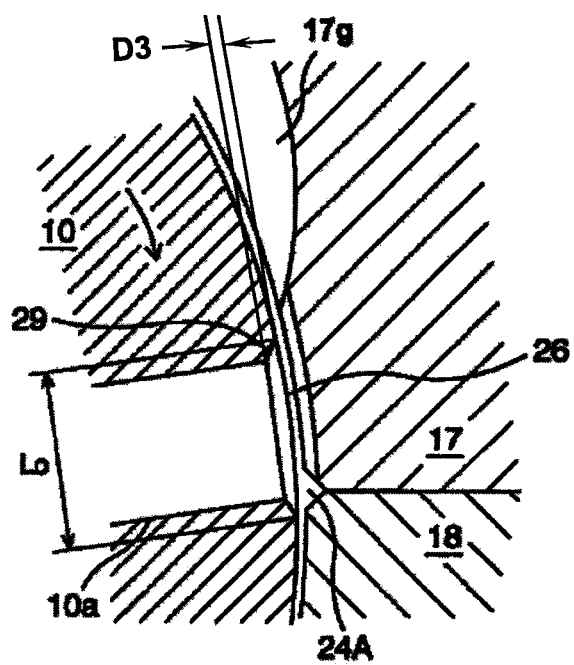
FIG. 10 is an enlarged sectional view of another example of the joint portion of the main bearing and the crankshaft shown in FIG. 2, seen from the axial direction.

The inlet opening 26 is described as having the same sectional area as the lubricating oil path 10 a in FIG. 6. However, the inlet opening 26 may have a sectional area larger than the lubricating oil path 10 a as shown in FIG. 10 as a result of machining, and may have a circular or elliptical opening shape on the outer circumferential surface of the journal portion 10. When the sectional area of the inlet opening 26 is larger than the sectional area of the lubricating oil path 10 a, a channel transition portion 29 the sectional area of which gradually changes in the oil path direction is formed with a depth D3 of 1 to 2 mm between the inlet opening 26 and the lubricating oil path 10 a. In any case, the inlet opening 26 has a length (linear distance) Lo in the circumferential direction on the outer circumferential surface of the journal portion 10.

When a foreign matter 28 is included in the lubricating oil which is supplied to the oil groove 17g, the foreign matter 28 moves to any one of both end portions in the circumferential direction of the oil groove 17g due to a specific gravity difference between the foreign matter 28 and the lubricating oil (FIG. 6). In the conventional crankshaft main bearing, the foreign matter remains in the end portion in the circumferential direction of the oil groove, and becomes the cause of inducing damage to the slide surface between the journal portion and the main bearing, or the foreign matter flows into the lubricating oil path along with the lubricating oil when the inlet opening of the journal portion passes the end portion in the circumferential direction of the oil groove, and becomes the cause of inducing damage to the slide surface between the crankpin and the connecting rod bearing.

Figure 11:
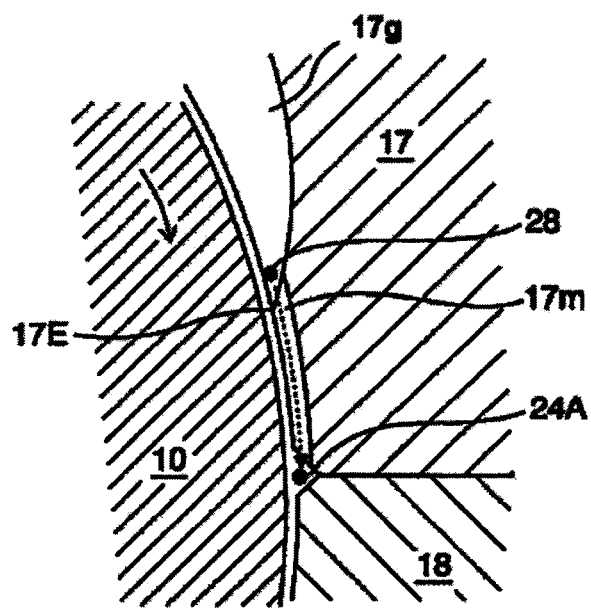
FIG. 11 is an enlarged sectional view of one joint portion seen from the axial direction, for explaining a function of the main bearing shown in FIG. 2.
Figure 12:
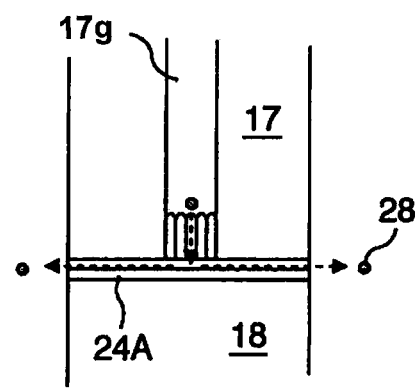
FIG. 12 is a view of one joint portion seen from the bearing inner circumferential surface side, for explaining a function of the main bearing shown in FIG. 2.

However, according to the embodiment of the present invention, a minute steady flow (or rectified flow) of oil toward the axial groove 24A from the oil groove 17g is formed by a plurality of circumferential grooves 17m which are formed between the circumferential end portion 17E of the oil groove 17g and the axial groove 24A, whereby the foreign matter 28 is fed to the axial groove 24A and can be further discharged to the outside of the main bearing 19 (FIGS. 11 and 12). At this time, the steady flow of the oil is minute, and therefore, excessive leakage of the lubricating oil is prevented.

In general, the foreign matter 28 is a metal or the like which remains inside the oil path at a time of cutting of the lubricating oil path in the bearing. Many of metal burrs which are made in the shape of a thin piece due to cutting have a maximum length of approximately 0.1 mm, and a thickness of less than 0.002 mm. The depths and the widths of the circumferential grooves 17m and 17n need to have such a minimum size that allows entry and passage of the foreign matter in consideration of the size of the foreign matters which are present in the lubricating oil, and to be set to prevent increase of the oil leakage amount at the same time. In the present embodiment, the maximum depth D2 of the circumferential grooves 17m and 17n is 0.002 to 0.015 mm, and the width WB of the circumferential grooves 17m and 17n is 0.1 to 1 mm. More desirably, the maximum depth D2 of the circumferential grooves 17m and 17n is 0.004 to 0.007 mm. When the maximum depth D2 and the width WB of each of the circumferential grooves 17m and 17n are larger than these values, the oil leakage amount increases, whereas when the maximum depth D2 and the width WB thereof are smaller than these values, the foreign matter cannot enter the circumferential grooves, or even if the foreign matter can enter the circumferential grooves, the foreign matter is in contact with the surface of the journal portion 10 to be pushed into the inner circumferential surfaces of the circumferential grooves, and is easily deposited.

Further, the maximum depth D2 and the width WB of each of the circumferential grooves 17m and 17n are constant along the circumferential direction, and accordingly, a groove sectional area perpendicular to the circumferential direction of the main bearing 19 is also practically constant along the circumferential direction. Thereby, a constant flow (constant amount of flow) of the oil is formed in the circumferential grooves, and increase in the oil leakage amount and deviation of the foreign matter from the insides of the grooves can be prevented. For example, if the sectional areas of the circumferential grooves become larger toward the circumferential end portions of the semi-cylindrical bearing 17, the amount of the oil which flows into the axial groove 24A from the end portion 17E of the oil groove 17g increases and the oil leakage amount increases. Further, if the sectional areas of the circumferential grooves become smaller toward the circumferential end portions of the semi-cylindrical bearing 17, the pressure and flow velocity of the oil which flows in the circumferential grooves change, and therefore, the foreign matter deviates from the circumferential grooves to enter a space between the inner circumferential surface of the semi-cylindrical bearing 17 and the surface of the journal portion, or passes the axial groove to enter a space between the inner circumferential surface of the semi-cylindrical bearing 18 on the lower side and the surface of the journal portion, whereby the inner circumferential surface of the main bearing 19 is easily subjected to damage.

Further, in order to reduce leakage of the lubricating oil from the main bearing, the steady flow of the oil is desirably minute as long as the flow can feed a foreign matter to the axial groove. Therefore, in the present invention, in consideration of the fact that the oil path resistance due to contact with the inner surface of the circumferential groove acts on the lubricating oil which flows in the circumferential groove, a plurality of circumferential grooves 17m are formed between the oil groove 17g and the axial groove 24A to cause the oil path resistance to act, and the amount of the oil which flows into the axial groove 24A is controlled. This also restrains the foreign matter 28 from passing over the axial groove 24A and entering the inner circumferential surface of the semi-cylindrical bearing 18 on the lower side.

In the present embodiment, the circumferential groove 17m is formed throughout the entire width WA of the oil groove 17g, and therefore, the foreign matter 28 which flows inside the oil groove 17g along with the lubricating oil up to the circumferential end portion 17E can enter the circumferential groove 17m, even from any position in the width direction of the oil groove 17g. In the oil groove 17g, the depth becomes gradually smaller toward the circumferential end portion 17E of the oil groove 17g in the circumferential end portion region, and therefore, the depth is extremely shallow in the vicinity of the circumferential end portion 17E. If the width as the whole of the plurality of circumferential grooves 17m is smaller than the width WA of the oil groove 17g (or the plurality of circumferential grooves 17m are not formed throughout the entire width WA of the oil groove 17g), among the foreign matters which flow in the circumferential end portion direction of the oil groove 17g, the foreign matter which advances to a corner portion region where the circumferential groove 17m is not formed is highly likely to come in contact with the surface of the journal portion, be forced into the bottom surface of the oil groove 17g, and deposited. The deposited foreign matter is sometimes raked up by an edge portion of the inlet opening 26 which is formed in the surface of the journal portion and thereafter enters the lubricating oil path 10a to be fed to the connecting rod bearing.

Further, in the present invention, the circumferential groove 17m is formed on the bottom surface of the oil groove 17g even on the central portion side in the circumferential direction relative to the circumferential end portion 17E of the oil groove 17g, so that the overlap region is provided. Thereby, the foreign matter 28 can be caught by the circumferential groove 17m before the foreign matter 28 reaches the circumferential end portion 17E of the oil groove 17g, and flows in the circumferential direction. This configuration prevents deposition of the foreign matter in the circumferential end portion region where the depth of the oil groove 17g is extremely small. Accordingly, the length L2 of the overlap region of the oil groove 17g and the circumferential groove 17m is preferably 0.03 to 0.15 mm, and more preferably is 0.06 to 0.12 mm. This is because if the length L2 of the overlap region is shorter than the lower limit value, a foreign matter enters the shallow region on the circumferential end portion side of the oil groove and deposition easily occurs, whereas if the length L2 of the overlap region is longer than the upper limit value, the lubricating oil too easily flows into the circumferential groove from the oil groove, and the leakage amount of the oil increases.

Figure 8:
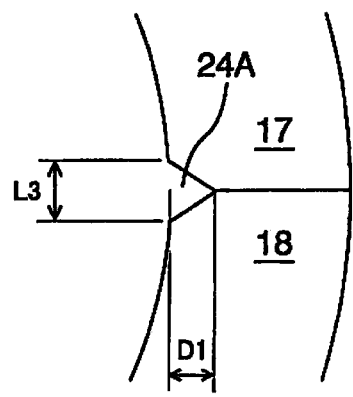
FIG. 8 is an enlarged front view of the joint portion of the main bearing shown in FIG. 2.

Referring to FIG. 8, a length (linear distance) L3 in the circumferential direction of the axial groove 24A on the circumferential surface of the main bearing 19 can be set to be 0.2 to 2 mm, and the maximum depth D1 of the axial groove 24A from the inner circumferential surface of the main bearing 19 can be set to be 0.1 to 0.5 mm. The length L3 in the circumferential direction and the depth D1 of the axial groove 24A are preferably made minimum dimensions which allow the foreign matter to be discharged in consideration of the size of the foreign matter (approximately 0.1 mm at the maximum in general) which are present in the lubricating oil.

Figure 13:
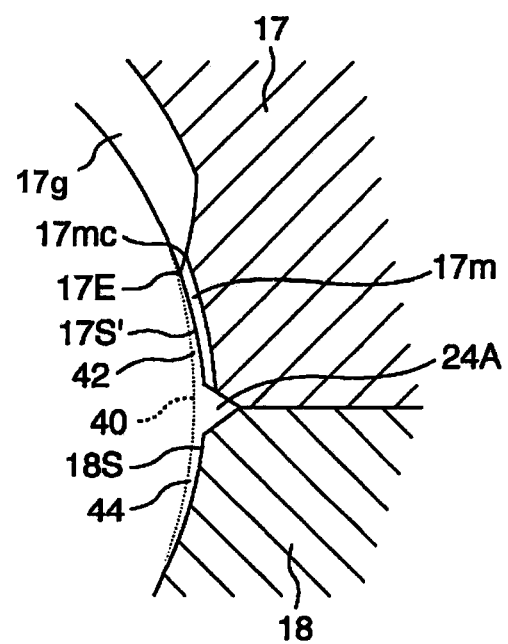
FIG. 13 is an enlarged sectional view of the joint portion of the main bearing shown in FIG. 2 in the case of being provided with a crush relief, seen from the axial direction.
Figure 14:
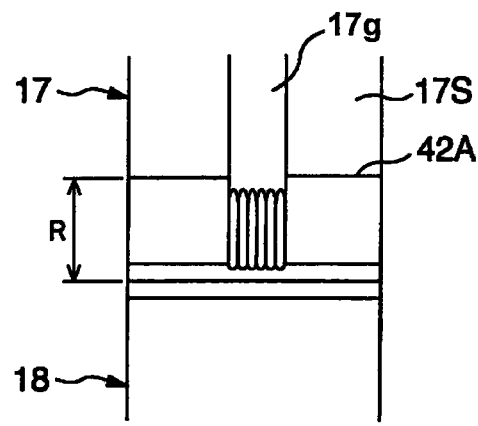
FIG. 14 is a view of the joint portion of the main bearing shown in FIG. 13, seen from the bearing inner circumferential surface side.

The crankshaft main bearing 19 according to the present invention may have crush reliefs 42 and 44 at the bearing inner circumferential surfaces adjacent to the joint portion of the semi-cylindrical bearings 17 and 18. The crush reliefs refer to release spaces 42 and 44 which are formed by decreasing thicknesses of wall portions in the circumferential end portion regions of the respective semi-cylindrical bearings 17 and 18, in the radial direction from an original inner circumferential surface 40 (main circular arc) which is concentric with a center of rotation, as shown in FIGS. 13 and 14, and the crush reliefs are formed to absorb a positional displacement and deformation of the circumferential end surfaces of the semi-cylindrical bearings which can occur when, for example, a pair of the semi-cylindrical bearings 17 and 18 are assembled with the journal portion 10 of the crankshaft. Accordingly, a curvature center position of the bearing inner circumferential surface 17S in a region R where the crush relief 42 is formed differs from a curvature center position of the bearing inner circumferential surface (main circular arc) in the other region (see SAE J506 (item 3.26 and item 6.4), DIN1497, section 3.2, JIS D3102). In general, in the case of a compact internal combustion engine bearing for a passenger car, a depth (or a distance from the original inner circumferential surface to the actual inner circumferential surface) of the crush relief in the circumferential end surface of the semi-cylindrical bearing is approximately 0.01 to 0.05 mm.

Figure 15:
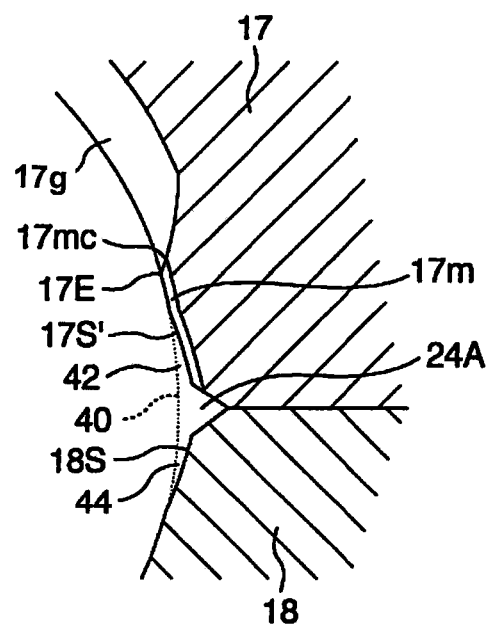
FIG. 15 is an enlarged sectional view of the joint portion of the main bearing shown in FIG. 2 in the case of being provided with a crush relief different from FIG. 13, seen from the axial direction.
Figure 16:
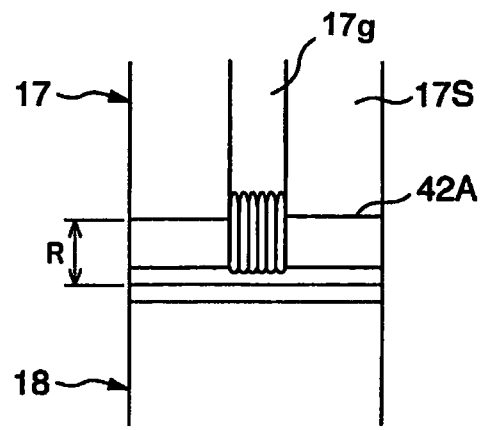
FIG. 16 is a view of the joint portion of the main bearing shown in FIG. 15, seen from the bearing inner circumferential surface side.

The crush relief 42 gradually decreases in depth toward a central side in the circumferential direction of the semi-cylindrical bearing 17, and an end portion 42A which defines a region where the crush relief 42 is formed is formed on the bearing inner circumferential surface 17S. The end portion 42A may be located on a central side in the circumferential direction relative to an end portion 17mc on the center side in the circumferential direction of the circumferential groove 17m as shown in FIGS. 13 and 14, or may be located on an end portion side in the circumferential direction relative to the end portion 17mc on the center side in the circumferential direction of the circumferential groove 17m as shown in FIGS. 15 and 16. This is because the depth of the crush relief 42 is sufficiently small as compared with the depths of the oil groove 17g and the axial groove 24A, and therefore, the difference between the original inner circumferential surface 40 and the actual inner circumferential surface 17S or the extension portion 17S' does not influence the discharge action of a foreign matter. However, when the circumferential end portion 42A of the crush relief 42 is located on the center side in the circumferential direction relative to the position of the end portion 17mc on the center side in the circumferential direction of the circumferential groove 17m, a gap which is formed between the inner circumferential surface 17S and the extension portion 17S' thereof, and the outer circumferential surface of the journal portion 10 slightly increases, and therefore, the amount of the oil which flows into the axial groove 24A from the oil groove 17g, that is, the amount of leakage from the main bearing 19 slightly increases. Accordingly, from the viewpoint of reducing the leakage amount of the lubricating oil, the end portion 42A of the crush relief 42 is preferably located on the end portion side in the circumferential direction relative to the end portion 17mc on the center side in the circumferential direction of the circumferential groove 17m as shown in FIGS. 15 and 16.

Note that even in the case in which the crush relief 42 is formed, the circumferential groove 17m is desirably has the constant depth D2 in the extension portion 17S' of the inner circumferential surface 17S. However, occurrence of a slight dimensional difference and a positional displacement due to precision of machining between the inner circumferential surface where the crush relief is not formed and the inner circumferential surface where the crush relief is formed may be allowed of course.

Figure 17:
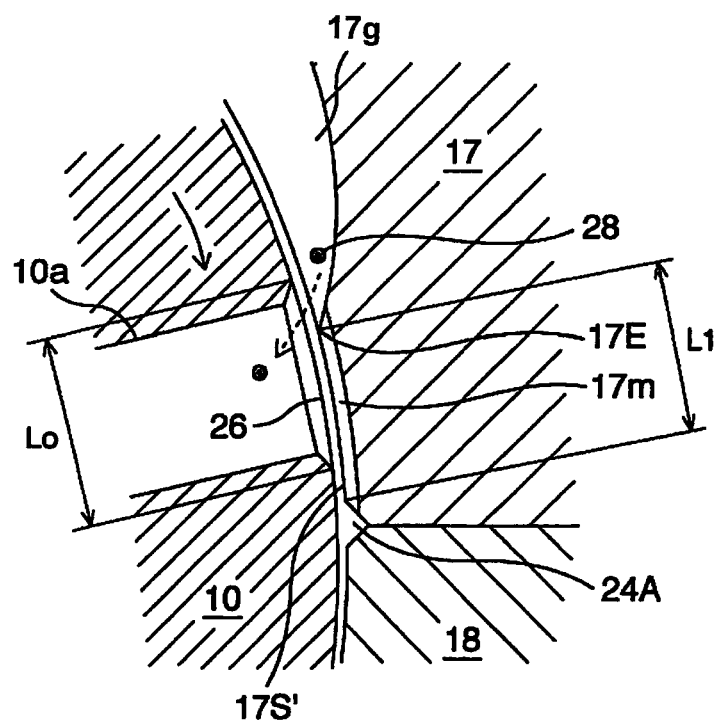
FIG. 17 is an enlarged sectional view of one joint portion seen from the axial direction, for explaining a function of the main bearing shown in FIG. 2.

Incidentally, when a large number of foreign matters are present in the lubricating oil, or when a foreign matter of a large size is present in the lubricating oil, the foreign matter cannot be completely discharged only by the steady flow of the oil which flows in the circumferential groove between the circumferential end portion of the oil groove and the axial groove, and sometimes remains in the circumferential end portions of the oil groove. The remaining foreign matter 28 enters the lubricating oil path 10a when the lubricating oil path 10a passes the vicinity of the end portion 17E of the oil groove 17g by rotation of the journal portion 10, and is fed to the connecting rod bearing (FIG. 17).

However, according to the present embodiment, the length L1 in the circumferential direction of the extension portion 17S' of the inner circumferential surface 17S between the circumferential end portion 17E of the oil groove 17g and the axial groove 24A, and a length Lo in the circumferential direction of the inlet opening 26 which is formed in the journal portion 10 satisfy:

$$Lo \times 1.5 > L1.$$

Figure 18:
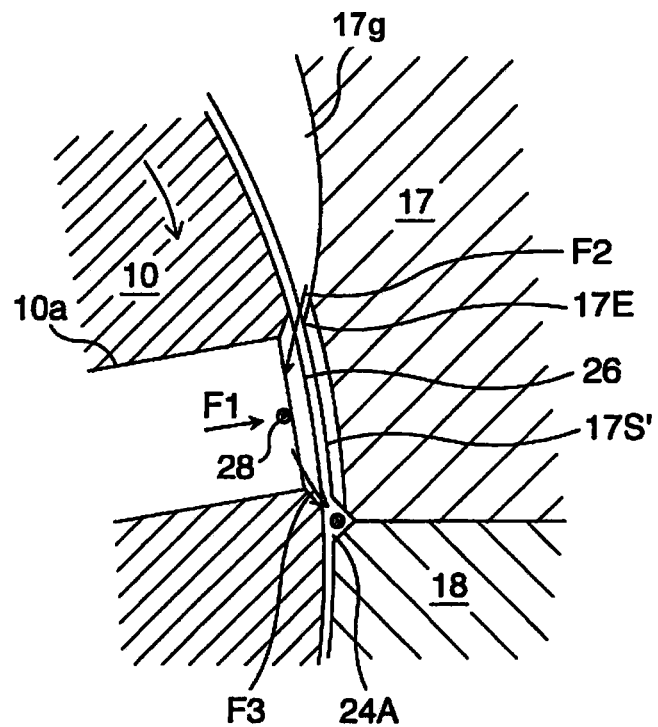
FIG. 18 is an enlarged sectional view of one joint portion seen from the axial direction, for explaining a function of the main bearing shown in FIG. 2.
Figure 19:
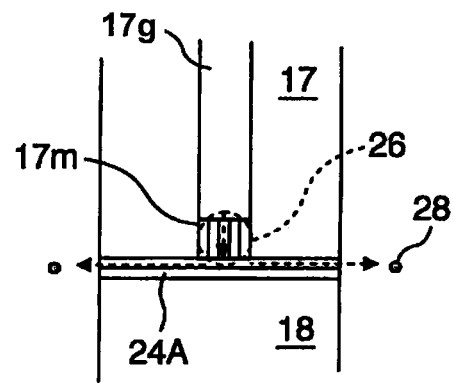
FIG. 19 is a view of one joint portion seen from the bearing inner circumferential surface side, for explaining a function of the main bearing shown in FIG. 2.

As is understood from FIGS. 18 and 19, in the case in which the length L1 in the circumferential direction of the extension portion 17S' is smaller than the length Lo in the circumferential direction of the inlet opening 26, when the oil groove 17g communicates with the axial groove 24A via the inlet opening 26, (1) a centrifugal force F1 due to rotation of the journal portion 10, (2) a flow F2 due to a pressure gradient of the lubricating oil in the oil groove 17g and the lubricating oil in the lubricating oil path 10a, and (3) a flow F3 due to a pressure gradient of the lubricating oil in the lubricating oil path 10a and the lubricating oil in the axial groove 24A simultaneously act on the foreign matter 28 and the lubricating oil inside the lubricating oil path 10a which is located in the vicinity of the inlet opening 26, and the flow of the lubricating oil is formed instantaneously so as to move some of the foreign matters which cannot be discharged only by the steady flow of the oil flowing in the circumferential groove 17m and remains in the oil groove 17g, and the foreign matter 28 which enters the lubricating oil path 10a to the axial groove 24a. Further, at this instant, the flow to the axial direction of the main bearing 19 is also formed in the axial groove 24A, and helps the foreign matter 28 to be discharged to outside the bearing.

Accordingly, for the flow of the lubricating oil which is sufficient to push the foreign matter 28 so as to enter the lubricating oil path 10a out to the axial groove 24A, the length L1 in the circumferential direction of the extension portion 17S' of the inner circumferential surface 17S and the length Lo in the circumferential direction of the inlet opening 26 preferably satisfy the relationship of "Lo−L1 $\geq$ 0.5 mm". Further, in order to prevent the lubricating oil from excessively flowing out when the oil groove 17g communicates with the axial groove 24A via the lubricating oil path 10a, the length L1 in the circumferential direction of the extension portion 17S' and the length Lo in the circumferential direction of the inlet opening 26 preferably satisfy a relationship of "L1 $\geq$ Lo×0.3", and more preferably satisfy a relationship of "L1 $\geq$ Lo×0.6". This is because if the length L1 in the circumferential direction of the extension portion 17S' is too short, the time period in which the oil groove 17g and the axial groove 24A communicate with each other becomes long, the amount of the oil which flows into the axial groove 24A from the end portion 17E of the oil groove 17g, that is, the leakage amount increases, and therefore, the amount of the oil which is fed to the connecting rod bearing 22 decreases.

When the sectional area of the inlet opening 26 is larger than the sectional area of the lubricating oil path 10a as described above, and the channel transition portions 29 are formed at both sides in the circumferential direction of at least the inlet opening 26, the lubricating oil in the oil groove 17g is guided by the inclined surfaces of the channel transition portions 29 and easily flows into the lubricating oil path 10a when the oil groove 17g and the axial groove 24A communicate with each other, and accordingly the flow F2 (FIG. 18) in the circumferential direction which forcefully passes the foreign matter 28 to the axial groove 24A can be strengthened. Further, the inclined surface at the front side in the rotational direction of the inlet opening 26 assists the foreign matter 28 to enter the axial groove 24A.

Figure 20:
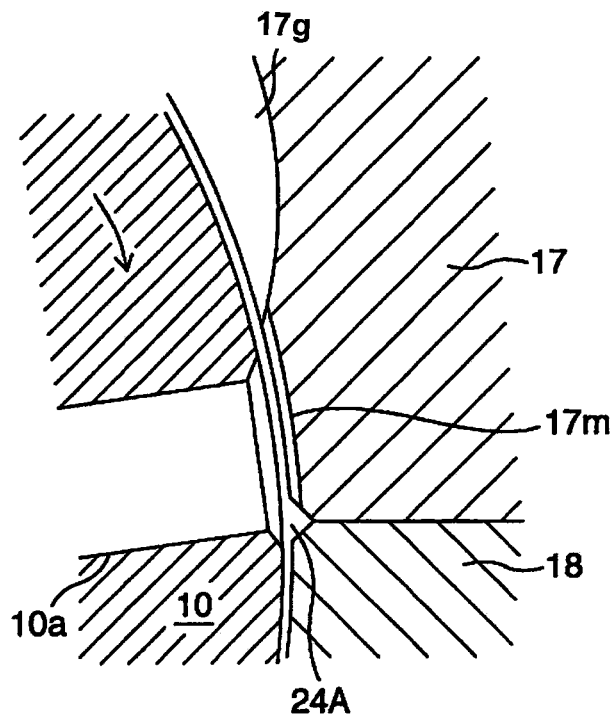
FIG. 20 is a view of one joint portion seen from the axial direction, for explaining a function of the main bearing shown in FIG. 2.
Figure 21:
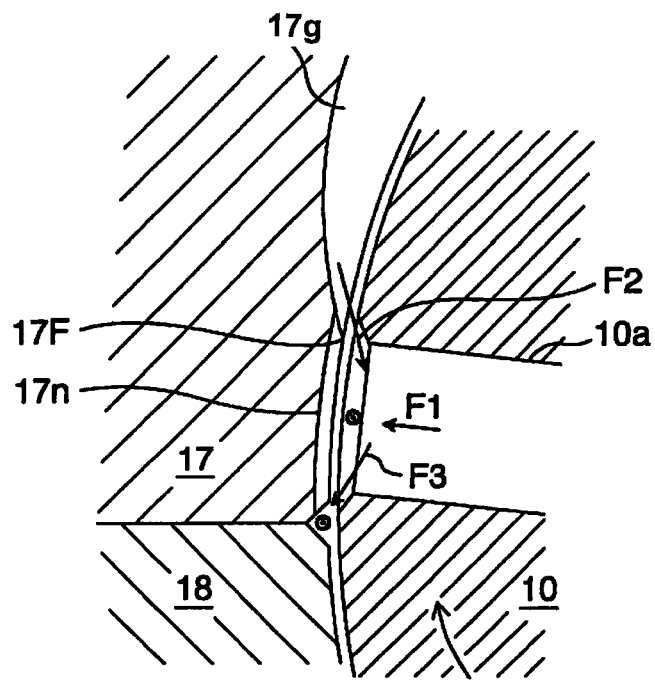
FIG. 21 is an enlarged sectional view of the other joint portion seen from the axial direction, for explaining a function of the main bearing shown in FIG. 2.

However, even if the length L1 in the circumferential direction of the extension portion 17S' is larger than the length Lo in the circumferential direction of the inlet opening 26, as long as the following relational expression described above:

$$Lo \times 1.5 > L1$$

is satisfied, the circumferential groove 17m effectively acts when the lubricating oil path 10a passes over the extension portion 17S', whereby the pressure gradient of the oil in the lubricating oil path 10a and the oil in the axial groove 24a occurs to promote discharge of the foreign matter 28 similarly to the case of FIG. 18. Note that when the communication state of the oil groove 17g and the lubricating oil path 10a finishes as shown in FIG. 20, the flow of the oil to the axial groove 24A from the oil groove 17g via the lubricating oil path 10a is not present, and outflow of the lubricating oil from the main bearing 19 is suppressed, while a minute steady flow of the oil which flows in the circumferential groove 17m is formed again. According to the present embodiment, the length L1 in the circumferential direction of the extension portion 17S' of the inner circumferential surface 17S is smaller than the length 1.5 times as large as the length Lo in the circumferential direction of the inlet opening 26, whereby at the instant when the oil groove 17g and the axial groove 24B communicate with each other via the inlet opening 26 at the end portion 17F on the rear side in the rotational direction of the oil groove 17g, the aforementioned actions F1 to F3 work as shown in FIG. 21, and therefore, the foreign matter can be discharged while the leakage amount of the lubricating oil is reduced.

Embodiment 2

Figure 22:
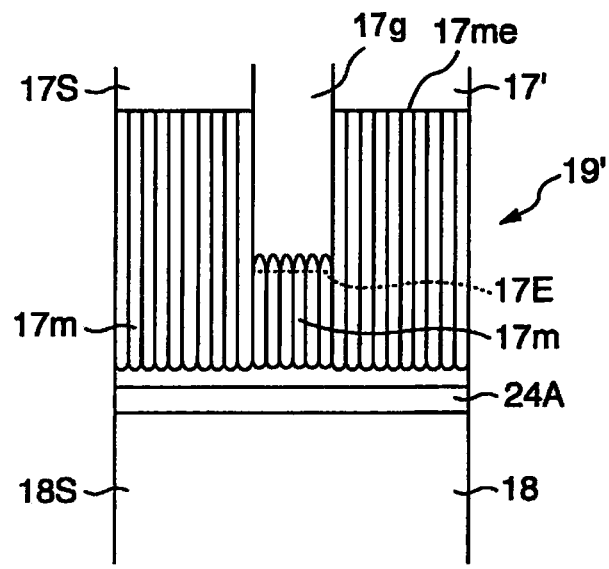
FIG. 22 is a view of a joint portion of a crankshaft main bearing according to embodiment 2 of the present invention, seen from a bearing inner circumferential side.

FIG. 22 shows a crankshaft main bearing 19' according to embodiment 2 of the present invention. As is understood from the drawing, the circumferential grooves 17m are formed between the oil groove 17g of a semi-cylindrical bearing 17' and the axial groove 24A similarly to embodiment 1. However, when the circumferential groove 17m is formed by cutting after the semi-cylindrical bearing is formed, the circumferential grooves 17m can be produced more easily by forming the same circumferential grooves 17m also on the inner circumferential surface of the semi-cylindrical bearing at the same time, and therefore, in the present embodiment, the circumferential grooves 17m are formed also on the inner circumferential surface 17S other than the extension portion 17S' between the oil groove 17g of the semi-cylindrical bearing 17' and the axial groove 24A. As long as the circumferential grooves 17m according to the present invention are formed between the oil groove 17g and the axial groove 24A, the effect of the present invention can be obtained.

Figure 23:
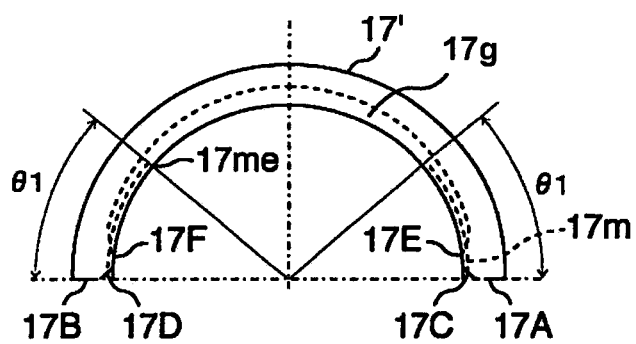
FIG. 23 is a front view of a semi-cylindrical bearing on an upper side of the main bearing shown in FIG. 22.

In embodiment 2 shown in FIG. 22, the circumferential grooves 17m are formed throughout an entire width in an axial direction of the semi-cylindrical bearing 17' beyond the extension portion 17S' of the inner circumferential surface 17S. Further, as is understood from FIG. 23, a circumferential angle θ1 at which the circumferential groove 17m is formed is within a range up to 50° around the rotational axis of the main bearing 19 from the circumferential end surfaces 17A and 17B toward a center side in the circumferential direction, and therefore, the circumferential groove 17m has an end portion 17me on the center side in the circumferential direction on the inner circumferential surface 17S. The lower limit value of the circumferential angle θ1 is not limited as long as the configuration of the present invention is obtained, but it is not desirable to form the circumferential groove 17m in the vicinity of the center portion in the circumferential direction in which the semi-cylindrical bearing 17' receives a load from the journal portion 10 of the crankshaft, and therefore, the upper limit value of the circumferential angle θ1 is desirably 50°.

Note that a circular arc which is formed by the inner circumferential surface 17S in the range of the circumferential angle θ1 of the semi-cylindrical bearing 17', and a circular arc formed by the inner circumferential surface 17S in the center portion in the circumferential direction of the semi-cylindrical bearing 17' may have slightly different radiuses of curvature. Further, such circumferential grooves 17m may be also formed in the region at the circumferential end portion side of the inner circumferential surface 18S of the semi-cylindrical bearing 18 on the lower side.

Embodiment 3

Figure 24:
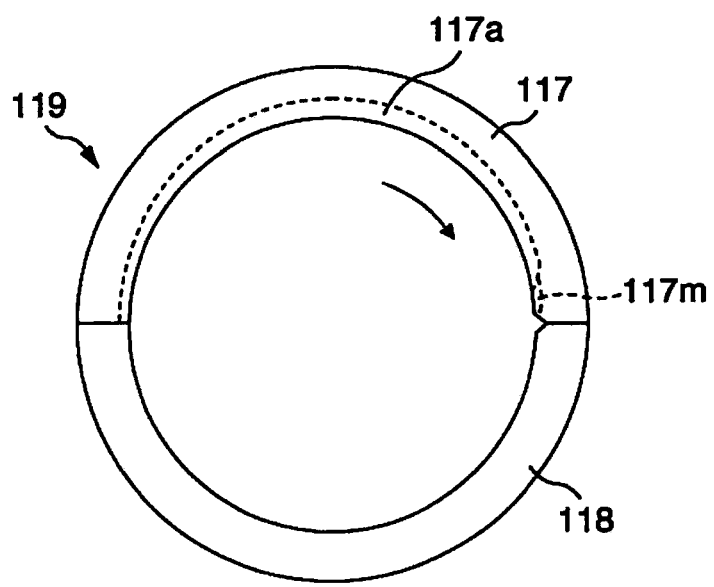
FIG. 24 is a front view of a crankshaft main bearing according to embodiment 3 of the present invention.

FIG. 24 shows a crankshaft main bearing 119 according to embodiment 3 of the present invention. As is understood from the drawing, an axial groove is formed only in a joint portion on the right side of the paper surface, among joint portions of semi-cylindrical bearings 117 and 118, and an oil groove 117a which is formed in the semi-cylindrical bearing 117 on the upper side of the paper surface has the configuration of the present invention described above only on a front side in the rotational direction of the journal portion. Namely, the oil groove 117a has a depth decreased gradually toward an end portion on the front side in the rotational direction, and thereby, an extension portion of an inner circumferential surface and a circumferential groove 117m on the front side in the rotational direction. Meanwhile, the oil groove 117a keeps a constant depth from the region including the center portion in the circumferential direction to the end portion on the rear side in the rotational direction, and thereby extends to the circumferential end surface of the semi-cylindrical bearing 117.

Embodiment 4

Figure 25:
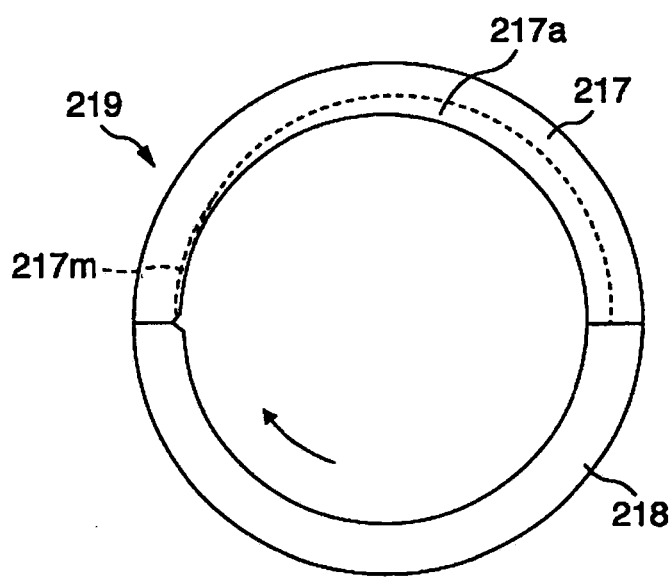
FIG. 25 is a front view of a crankshaft main bearing according to embodiment 4 of the present invention.

FIG. 25 shows a crankshaft main bearing 219 according to embodiment 4 of the present invention. As is understood from the drawing, an axial groove is formed only in a joint portion on the left side of the paper surface, among joint portions of semi-cylindrical bearings 217 and 218, and an oil groove 217a which is formed in the semi-cylindrical bearing 217 on the upper side of the paper surface has the aforementioned configuration of the present invention only on a rear side in the rotational direction of the journal portion. That is to say, the oil groove 217a extends in the circumferential direction so that a depth thereof is decreased gradually toward an end portion on the rear side in the rotational direction from an end surface on a front side in the rotational direction of the semi-cylindrical hearing 217, and thereby an extension portion of an inner circumferential surface and a circumferential groove 217m are formed only on the rear side in the rotational direction.

The above description is made for the embodiments, but it is obvious to a person skilled in the art that the present invention is not limited thereto, and various modifications and corrections can be made within the range of the spirit and the accompanying claims of the present invention. For example, in each of the above described embodiments, the oil groove is formed in the semi-cylindrical bearing on the upper side, but the oil groove may be formed only in the semi-cylindrical bearing on the lower side. Further, the oil groove may be formed so that the depth is maximum at the center portion in the circumferential direction of the semi-cylindrical bearing, and gradually decreases toward both end portions in the circumferential direction of the semi-cylindrical bearing, whereby the extension portions of the inner circumferential surface and the circumferential grooves may be provided at both sides in the circumferential direction, and the sectional shape orthogonal to the longitudinal direction of the oil groove may be an optional shape such as an inverted trapezoid shape, a semicircular shape, and a triangular shape besides the rectangular shape.

The invention claimed is:

1. A crankshaft main bearing assembly comprising:
a journal portion of a crankshaft which is supported by a main bearing,
wherein the main bearing is composed of a pair of semi-cylindrical bearings, and defines an axial direction and a circumferential direction,
only one of the semi-cylindrical bearings comprises an oil groove formed on an inner circumferential surface thereof, the oil groove extends in the circumferential direction at least through a center portion of the one semi-cylindrical bearing in the circumferential direction, a depth of the oil groove from the inner circumferential surface decreases toward a circumferential end surface of the one semi-cylindrical bearing so as to define a circumferential end portion of the oil groove on the inner circumferential surface, so that the oil groove does not extend to the circumferential end surface,
the circumferential end surface of the one semi-cylindrical bearing to which the oil groove does not extend, and a circumferential end surface of the other semi-cylindrical bearing which is joined to the one semi-cylindrical bearing respectively include inclined surfaces extending on an inner circumferential surface side over an entire length thereof in the axial direction, so that an axial groove is formed at a joint portion of the pair of semi-cylindrical bearings, and an extension portion of the inner circumferential surface extends between the axial groove and the oil groove,
a plurality of circumferential grooves extending in the circumferential direction from the axial groove to the oil groove are formed on the extension portion of the inner circumferential surface over an entire width of the circumferential end portion of the oil groove in the axial direction, a depth of the plurality of circumferential grooves from the extension portion of the inner circumferential surface is smaller than the depth of the oil groove, so that an overlap region where the plurality of circumferential grooves and the oil groove overlap each other is formed in a region where the depth of the oil groove decreases, and
the depth of each of the circumferential grooves is within a range of 0.002 to 0.015 mm and constant in the circumferential direction, a width of each of the circumferential grooves in the axial direction is within a range of 0.1 to 1 mm and constant in the circumferential direction, and a length of the overlap region in the circumferential direction is within a range of 0.03 to 0.15 mm.

2. The crankshaft main bearing assembly according to claim 1, wherein a depth of the axial groove from the inner circumferential surface is 0.1 to 0.5 mm, and a width of the axial groove in the circumferential direction is 0.2 to 2 mm.

3. The crankshaft main bearing assembly according to claim 1, wherein the circumferential grooves are formed on the inner circumferential surface over an entire width of the one semi-cylindrical bearing in the axial direction.

4. The crankshaft main bearing assembly according to claim 3, wherein the circumferential grooves are formed on the circumferential surface so as to extend in the circumferential direction around a rotational axis of the main bearing within a range of 50° from the circumferential end surface at which the axial groove is formed.

5. The crankshaft main bearing assembly according to claim 1, wherein the semi-cylindrical bearing with the oil groove has the circumferential grooves at both sides in the circumferential direction.

6. The crankshaft main bearing assembly according to claim 1, wherein the one semi-cylindrical bearing has a crush relief on an inner circumferential surface side adjacent to the circumferential end surface at which the axial groove is formed.

7. The crankshaft main bearing assembly according to claim 6, wherein an end portion of the crush relief formed on a side in the circumferential direction of the one semi-cylindrical bearing is located on a circumferential end surface side relative to an end portion of one of the plurality of circumferential grooves disposed on the side in the circumferential direction.

8. The crankshaft main bearing assembly according to claim 1, wherein the journal portion includes a lubricating oil path extending in an inside thereof, and an inlet opening of the lubricating oil path that is formed on an outer circumferential surface thereof, and the oil groove is disposed so that a center of the width of the oil groove in the axial direction is aligned with a center of the inlet opening of the journal portion.

9. The crankshaft main bearing assembly according to claim 8, wherein a length L1 of the extension portion of the inner circumferential surface in the circumferential direction, and a length Lo of the inlet opening of the journal portion in the circumferential direction satisfy the following relational expression:

$$Lo \times 1.5 > L1.$$

10. The crankshaft main bearing assembly according to claim 8, wherein a length L1 of the extension portion of the inner circumferential surface in the circumferential direction, and a length Lo of the inlet opening of the journal portion in the circumferential direction satisfy the following relational expression:

$$Lo - L1 \geq 0.5 \text{ mm}.$$

11. The crankshaft main bearing assembly according to claim 8, wherein a length L1 of the extension portion of the inner circumferential surface in the circumferential direction, and a length Lo of the inlet opening of the journal portion in the circumferential direction satisfy the following relational expression:

$$L1 \geq Lo \times 0.3.$$

12. The crankshaft main bearing assembly according to claim 11, wherein the length L1 of the extension portion of the inner circumferential surface in the circumferential direction, and the length Lo of the inlet opening of the journal portion in the circumferential direction satisfy the following relational expression:

$$L1 \geq Lo \times 0.6.$$

13. The crankshaft main bearing assembly according to claim 8, wherein an area of the inlet opening on an outer circumferential surface of the journal portion is larger than a sectional area of the lubricating oil path in the journal portion, so that a channel transition portion of which the sectional area changes is formed between the inlet opening and the lubricating oil path.

14. The crankshaft main bearing assembly according to claim 13, wherein a depth dimension of the channel transition portion from the outer circumferential surface of the journal portion is 1 to 2 mm.

* * * * *